(12) United States Patent
Kim et al.

(10) Patent No.: US 12,345,948 B2
(45) Date of Patent: Jul. 1, 2025

(54) CAMERA ACTUATOR AND CAMERA MODULE INCLUDING THE SAME

(71) Applicant: LG INNOTEK CO., LTD., Seoul (KR)

(72) Inventors: Chang Yeon Kim, Seoul (KR); Kyung Won Kim, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 0 days.

(21) Appl. No.: 18/601,240

(22) Filed: Mar. 11, 2024

(65) Prior Publication Data

US 2024/0219681 A1 Jul. 4, 2024

Related U.S. Application Data

(63) Continuation of application No. 17/286,647, filed as application No. PCT/KR2019/013809 on Oct. 21, 2019, now Pat. No. 11,966,097.

(30) Foreign Application Priority Data

Oct. 19, 2018 (KR) .................. 10-2018-0125312

(51) Int. Cl.
*G02B 7/09* (2021.01)
*G02B 27/64* (2006.01)
(Continued)

(52) U.S. Cl.
CPC ............. *G02B 7/09* (2013.01); *G02B 27/646* (2013.01); *G03B 3/10* (2013.01); *G03B 5/00* (2013.01);
(Continued)

(58) Field of Classification Search
CPC ........ H04N 23/54; H04N 23/55; H04N 23/57; H04N 23/60; H04N 23/676; G02B 7/09;
(Continued)

(56) References Cited

U.S. PATENT DOCUMENTS 4,864,170 A 9/1989 Eguchi
5,835,799 A 11/1998 Washisu
(Continued)

FOREIGN PATENT DOCUMENTS

CN 103454745 A 12/2013
CN 206627682 U 11/2017
(Continued)

OTHER PUBLICATIONS

International Search Report dated Feb. 7, 2020 in International Application No. PCT/KR2019/013809.
(Continued)

*Primary Examiner* — Kelly L Jerabek
(74) *Attorney, Agent, or Firm* — SALIWANCHIK, LLOYD & EISENSCHENK (57) ABSTRACT

The embodiment relates to a camera actuator and a camera module including the same. The camera actuator according to the embodiment includes a base, a lens housing disposed on the base, a guide pin disposed on the base, a ball disposed between the guide pin and the lens housing, and a first yoke disposed on the lens housing, a magnet coupled to an inside of the first yoke, and a coil unit facing the magnet surrounding a part of the first yoke and fixed to the magnet. The embodiment may include a second yoke disposed under the first yoke to form a closed loop together with the first yoke.

16 Claims, 11 Drawing Sheets

(51) Int. Cl.
*G03B 3/10* (2021.01)
*G03B 5/00* (2021.01)
*G03B 13/36* (2021.01)
*H04N 23/54* (2023.01)
*H04N 23/55* (2023.01)

(52) U.S. Cl.
CPC ............ *G03B 13/36* (2013.01); *H04N 23/54* (2023.01); *H04N 23/55* (2023.01); *G03B 2205/0007* (2013.01)

(58) Field of Classification Search
CPC .......... G02B 7/021; G02B 7/023; G02B 7/08; G02B 27/646; G03B 3/10; G03B 5/00; G03B 13/36; G03B 30/00; G03B 2205/0069; G03B 2205/0007; G03B 2205/0045; H02K 16/00; H02K 41/031
See application file for complete search history.

(56) References Cited

U.S. PATENT DOCUMENTS

| | | | |
|---|---|---|---|
| 9,188,762 | B2 | 11/2015 | Baik et al. |
| 9,658,514 | B2 | 5/2017 | Baik et al. |
| 9,900,486 | B2 | 2/2018 | Moon et al. |
| 10,386,651 | B2 | 8/2019 | Kim et al. |
| 11,966,097 | B2 * | 4/2024 | Kim .................... G03B 3/10 |
| 2013/0141541 | A1 | 6/2013 | Jung et al. |
| 2013/0314806 | A1 | 11/2013 | Park et al. |
| 2013/0321937 | A1 | 12/2013 | Baik et al. |
| 2015/0062408 | A1 | 3/2015 | Yano |
| 2016/0054641 | A1 | 2/2016 | Baik et al. |
| 2016/0320586 | A1 | 11/2016 | Moon et al. |
| 2017/0160558 | A1 | 6/2017 | Kim et al. |
| 2019/0049692 | A1 | 2/2019 | Choi et al. |
| 2021/0096321 | A1 | 4/2021 | Choi |

FOREIGN PATENT DOCUMENTS

| | | |
|---|---|---|
| CN | 108375863 A | 8/2018 |
| JP | 2012-93558 A | 5/2012 |
| KR | 10-2005-0102561 A | 10/2005 |
| KR | 10-2011-0135503 A | 12/2011 |
| KR | 10-1440807 B1 | 9/2014 |
| KR | 10-2015-0104703 A | 9/2015 |
| KR | 10-2016-0129475 A | 11/2016 |
| KR | 10-2017-0139986 A | 12/2017 |
| WO | 2017/135789 A1 | 8/2017 |

OTHER PUBLICATIONS

Office Action dated Sep. 15, 2022 in Chinese application No. 201980068797.X.

Office Action dated Aug. 24, 2023 in U.S. Appl. No. 17/286,647.

Notice of Allowance dated Dec. 11, 2023 in U.S. Appl. No. 17/286,647.

* cited by examiner

CAMERA ACTUATOR AND CAMERA MODULE INCLUDING THE SAME

CROSS-REFERENCE TO RELATED APPLICATIONS

This application is a continuation of U.S. application Ser. No. 17/286,647, filed Apr. 19, 2021; which is the U.S. national stage application of International Patent Application No. PCT/KR2019/013809, filed Oct. 21, 2019, which claims the benefit under 35 U.S.C. § 119 of Korean Application No. 10-2018-0125312, filed Oct. 19, 2018, the disclosures of each of which are incorporated herein by reference in their entirety.

TECHNICAL FIELD

This embodiment relates to a camera actuator and a camera module including the same.

BACKGROUND ART

A camera module performs a function of photographing and saving it as an image or video, and is being installed in mobile phones, laptops, drones, and vehicles.

On the other hand, mobile devices such as smartphones, tablet PCs, and laptops have a micro-camera module built in, and the camera module can perform an autofocus function by automatically adjusting the distance between the image sensor and the lens.

Recently, camera modules can perform a zooming function of zooming up or zooming out by increasing or decreasing the magnification of a distant focal point through a zoom lens. In recent years, there is an increasing demand for high magnification zooming that is more than twice that of a camera module.

On the other hand, a zoom actuator is used for the zooming function in the camera module. But friction torque is generated when the lens moves due to the mechanical movement of the actuator. Technical problems such as a decrease in driving force, an increase in power consumption, or a decrease in control characteristics are caused by such friction torque.

In addition, in order to obtain the best optical characteristics using a plurality of zoom lens groups in a camera module, the alignment between the plurality of lens groups must be well matched. However, a decent in which the spherical centers of the lens groups deviate from the optical axis or tilt, which is a lens inclination phenomenon, occurs. Accordingly, the angle of view changes or out-of-focus occurs, which adversely affects image quality and resolution.

On the other hand, in the case of increasing the separation distance in the area where friction occurs, which reduces the friction torque resistance when moving the lens for the zooming function in the camera module, there is a technical contradiction in which a lens decent or a lens tilt is deepened when a zoom movement or a zoom movement is reversed.

In particular, if high magnification is required in the camera module, the stroke increases than before, and if the weight of the camera module becomes heavy, the movement itself becomes more difficult. However, there is no suitable solution to the demands of high magnification and heavy weight. In particular, there is a problem in that the lens decent or the lens tilt becomes more severe in a high magnification and heavy use situation.

On the other hand, the contents described in this item merely provide background information on the embodiments of the applied invention and do not constitute a prior art.

DISCLOSURE

Technical Problem

One of the technical objects of the embodiment is to provide a camera actuator and a camera module including the same, capable of smoothly performing a zooming function or an AF function in a high magnification, high-heavy situation.

In addition, one of the technical objects of the embodiment is to provide a camera actuator, and a camera module including the same, capable of inhibiting occurrence of a lens decenter or lens tilt when a lens is moved in a high magnification, high-heavy situation.

In addition, one of the technical objects of the embodiment is to provide a camera actuator, and a camera module including the same, capable of inhibiting from generating friction torque while the lens is moved through zooming in the camera module in a high magnification or in high-heavy situations.

The technical problem of the embodiment is not limited to that described in this item, but includes what can be understood from the entire description of the invention.

Technical Solution

The camera actuator according to the embodiment includes a base 20, a lens housing 110 disposed on the base 20, a guide pin 50 disposed on the base 20, a ball 70 disposed between the guide pin and the lens housing, a first yoke disposed in the lens housing 110, a magnet coupled to an inside of the first yoke and a magnet facing the magnet, and a coil unit 220 surrounding a part of the first yoke and fixed to the magnet.

The embodiment may include a second yoke 212 disposed under the first yoke 211 to form a closed loop together with the first yoke.

A first length of the second yoke in an optical axis direction may be greater than or equal to a second length of the magnet in the optical axis direction.

The first yoke may be elongated in a direction of the optical axis, and the coil portion may be elongated in a direction perpendicular to the optical axis.

The magnet may be disposed in a yoke assembly including the first yoke and the second yoke.

The magnetic flux generated in the magnet may rotate in the yoke assembly along the first yoke and the second yoke.

The magnet includes a first-first magnet part having an N pole and a first-second magnet part having an S pole, and the first magnetic flux generated by the first-first magnet part can be rotated within the yoke assembly along the line with the first yoke and the second yoke.

Power can be applied to the coil unit so that current flows to generate a second magnetic flux so as to face the first magnetic flux direction. When the second magnetic flux is in the N-pole direction, repulsive force can be generated between the first magnetic flux and each other. And when the second magnetic flux is in the S-pole direction, attractive force may be generated between the first magnetic flux and each other.

The camera actuator according to the embodiment may include a base 20, a lens housing 110 disposed on the base 20, a guide pin 50 and a ball 70 disposed between the base 20 and the lens housing 110, a yoke assembly 210 disposed between the lens housing 110 and the base 20, and a coil unit 220 surrounding a part of the yoke assembly 210.

The base 20 may include a base body 20b and a first support part 21 and a second support part 22 disposed on the base body 20b.

A guide pin 50 may be disposed on the first support part 21, and the guide plate 60 may be disposed.

The ball 70 may include a first ball 71 disposed between the guide pin 50 and the lens housing 110, and a second 72 disposed between the guide plate 60 and the second support 22.

The lens housing 110 may include a lens barrel 112, a first protrusion 114 extending from the lens barrel 112 to a first side surface, and a second protrusion 116 extending from the lens barrel 112 to a second side surface.

A first receiving portion 114P and a second receiving portion 116P accommodating the first ball 71 and the second ball 72, respectively, on the bottom surfaces of the first protruding portion 114 and the second protruding portion 116 can be included.

The guide pin 50 may include a first guide pin 51 and the second guide pin 52 disposed on the first support part 21. The first ball 71 may be disposed in the first receiving portion 114P disposed on the first guide pin 51 and the second guide pin 52.

The embodiment may include a first magnet 260 disposed in the yoke assembly 210.

The yoke assembly 210 may be formed in a closed loop shape.

The yoke assembly 210 may include a U-shaped first yoke 211 and a second yoke 212 disposed below the first yoke 211 to form a closed loop.

In addition, the camera actuator according to the embodiment may include a base 20, a lens housing 110 disposed on the base 20, and a guide pin 50, a ball 70 disposed between the base 20 and the lens housing 110, a yoke assembly 210 disposed between the lens housing 110 and the base 20, a coil unit 220 surrounding a part of the yoke assembly 210, and a first magnet 260 disposed in the yoke assembly 210.

The yoke assembly 210 and the first magnet 260 may be disposed in a center portion of a lower side of the lens housing 110.

The coil unit 220 and the first magnet 260 may be disposed at a center of the lower side of the lens housing 110.

The embodiment may further include a second magnet 270 disposed below the base 20 at a position perpendicular to the yoke assembly 210.

The camera module of the embodiment may include the camera actuator and an image sensor unit disposed at one side of the camera actuator.

Advantageous Effects

The camera actuator and the camera module including the same according to the embodiment have a technical effect in that the zooming function or the AF function can be smoothly performed in a situation of high magnification and heavy weight.

For example, according to the embodiment, the first and second guide pins 51 and 52 may function to correct the first ball 71 from moving left and right. In addition, the first and second guide pins 51 and 52 are in four-point contact with the first ball 71, and the guide pin 50 may support the lens housing 110 having a heavy weight. Therefore, the zooming function or the AF function can be smoothly performed even in a situation of high magnification and heavy weight, and there is a technical effect of inhibiting the occurrence of lens decenter or lens tilt when the lens is moved.

In addition, according to the embodiment, there is a technical effect of inhibiting occurrence of a lens decenter or a lens tilt when a lens is moved under a high magnification and heavy weight situation.

For example, according to the embodiment, the yoke assembly 210 and the first magnet 260 may be disposed in the lower center of the lens housing 110. Accordingly, the yoke assembly 210 and the first magnet 260 may hold the center of gravity of the lens housing 110 when the lens housing 110 is moved even in a high magnification and heavy weight situation. Therefore, there is a special technical effect of inhibiting the occurrence of lens decenter or lens tilt by inhibiting tilting.

In addition, according to the embodiment, there is a technical effect of inhibiting the occurrence of friction torque when the lens is moved through zooming in the camera module in a situation of high magnification and heavy weight.

For example, according to the embodiment, the lens housing 110 may be driven by a magnetic force between the coil unit 220 and the first magnet 260 disposed at the lower center of the lens housing 110. Accordingly, since the position at which the driving force F2 (refer to FIGS. 6A and 6B) is generated becomes the center of the lens housing 110, the driving force F2 can be maximized. Therefore, there is a special technical effect that can effectively perform the zooming function in the camera module even in the situation of high magnification and heavy weight.

The technical effects of the embodiments are not limited to those described in this item, and include those that can be understood from the entire description of the invention.

MODE FOR INVENTION

Hereinafter, embodiments will be described in detail with reference to the accompanying drawings.

On the other hand, in the description of the embodiment, in the case where it is described as being formed in "up/down" or "above/below" of each element, includes both two components directly contacting each other, or one or more other configurations formed indirectly between the two configurations. In addition, when expressed as "up/down" or "above/below", it may include not only an up direction but a down direction based on one configuration.

In addition, the relational terms such as "upper/upper portion/up" and "lower/lower portion/down", etc., used below, do not require or imply any physical or logical relationship or order between such components or elements, it may be used to distinguish one component or element from another component or element.

In addition, in the description of the embodiment, terms such as "first" and "second" may be used to describe various elements, but these terms are used for the purpose of distinguishing one element from other elements. In addition, terms specifically defined in consideration of the configuration and operation of the embodiment are only for describing the embodiment, and do not limit the scope of the embodiment.

Embodiment

Figure 1A:
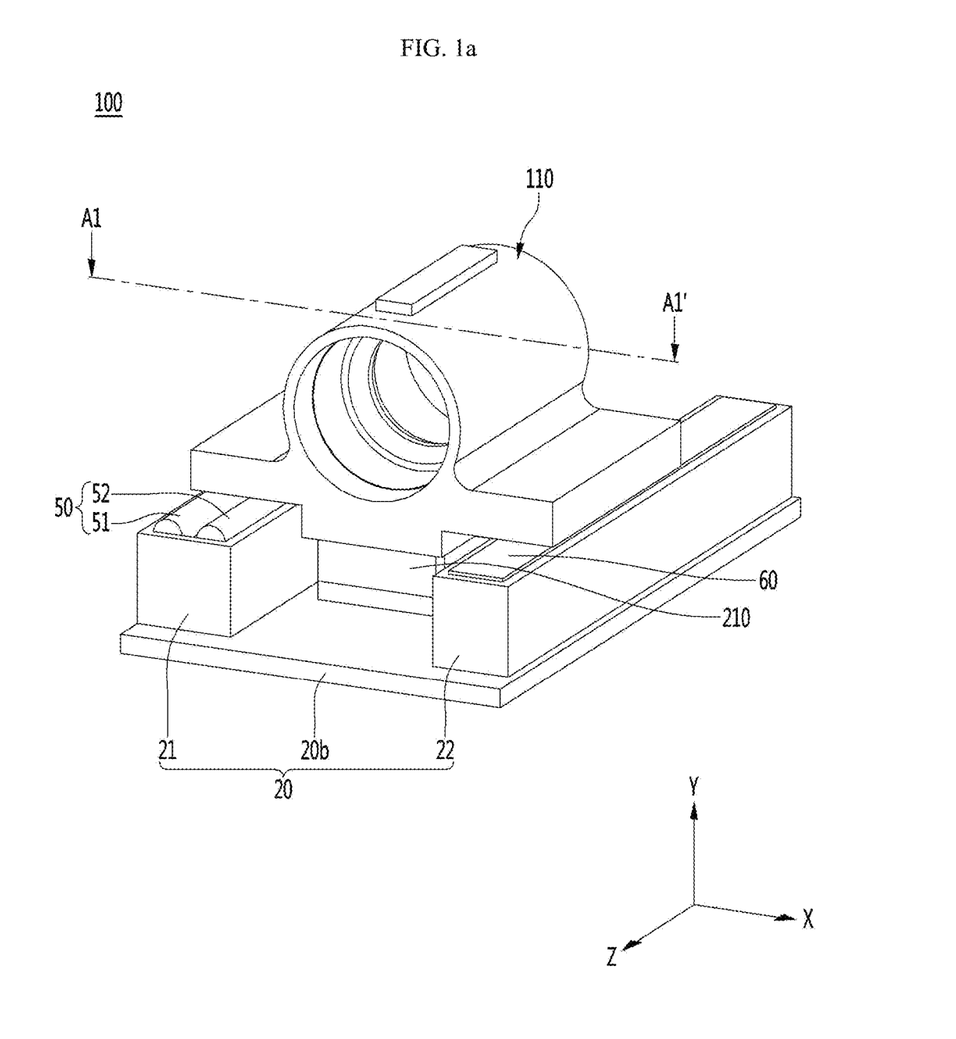
FIG. 1A is a perspective view of a camera actuator according to an embodiment.
Figure 1B:
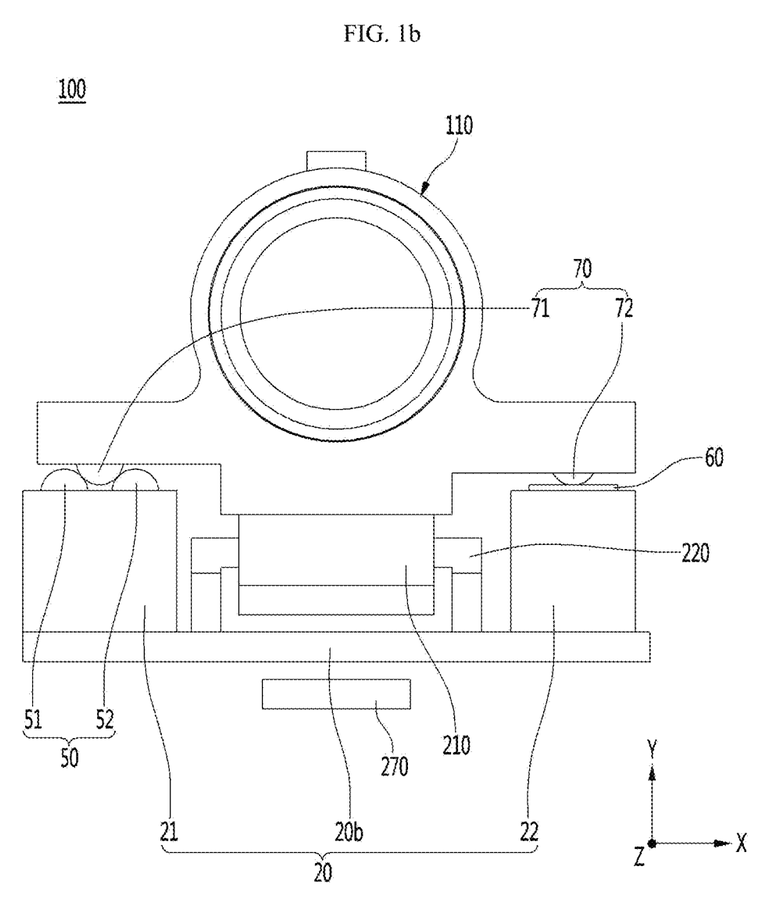
FIG. 1B is a front view of the camera actuator according to the embodiment shown in FIG. 1A.

FIG. 1A is a perspective view of the camera actuator 100 according to the embodiment, and FIG. 1B is a front view of the camera actuator 100 according to the embodiment shown in FIG. 1A.

In the xyz axis direction shown in FIGS. 1A and 1B, the z-axis means the optical axis direction or a direction parallel thereto, the xz plane represents the ground, and the x-axis is a direction perpendicular to the z-axis in the ground (xz plane). And the y-axis may mean a direction perpendicular to the ground.

Referring to FIG. 1A, the camera actuator 100 according to the embodiment may include at least one of a base 20, a lens housing 110, a guide pin 50, a guide plate 60, and a yoke assembly 210.

In addition, referring to FIG. 1B, the camera actuator 100 according to the embodiment may include the base 20, the lens housing 110 disposed on the base 20, a guide pin 50, a ball 70 disposed between the base 20 and the lens housing 110. The guide pin 50 may be referred to as a rod or a shaft, but is not limited thereto.

The embodiment may further include a cover (not shown) surrounding the base 20 and the lens housing 110.

In addition, the camera actuator 100 according to the embodiment may include a yoke assembly 210 disposed between the lens housing 110 and the base 20, and a coil unit 220 surrounding a part of the yoke assembly 210. A second magnet 270 may be disposed below the base 20 at a position vertically overlapping with the yoke assembly 210. The yoke assembly 210, the coil unit 220, and the second magnet 270 will be described later with reference to the drawings after FIG. 3A.

In addition, in an embodiment, a predetermined image sensor unit (not shown) may be disposed in one direction of the lens housing 110.

Referring to FIG. 1B, in the embodiment, the base 20 may include a base body 20b and a first support 21 and a second support 22 disposed on the base body 20b.

The first support part 21 and the second support part 22 may be respectively disposed on one side and the other side of the base body 20b, but are not limited thereto.

The first support part 21 and the second support part 22 may be formed integrally with or separated from the base body 20b.

In an embodiment, the material of the base body 20b may be formed of at least one of plastic, epoxy, polycarbonate, metal, or composite material.

The first support part 21 and the second support part 22 may be formed of the same material as the base body 20b or may be formed of a different material.

A predetermined guide pin 50 may be disposed on the first support part 21. The guide pin 50 may include a single or a plurality of guide pins. For example, the guide pin 50 may include a first guide pin 51 and a second guide pin 52 disposed on the first support part 21.

The guide pin 50 may be formed of at least one of plastic, epoxy, polycarbonate, metal, or composite material, but is not limited thereto.

A predetermined guide plate 60 may be disposed on the second support 22. The guide plate 60 may be formed of one or more of a metal or a composite material, but is not limited thereto. For example, the guide plate 60 may be formed of stainless steel, but is not limited thereto.

The embodiment may include a single or a plurality of balls 70 disposed under the lens housing 110. For example, the ball 70 may include a first ball 71 disposed between the guide pin 50 and the lens housing 110, and may include a second ball 72 disposed between the guide plate 60 and the second support 22.

The first ball 71 and the second ball 72 may be formed in a single number or in a plurality. For example, two first balls 71 and two second balls 72 may be disposed, but are not limited thereto (see FIG. 5A).

The ball 70 may be formed of one or more of plastic, epoxy, polycarbonate, metal, or composite material, but is not limited thereto.

Figure 2:
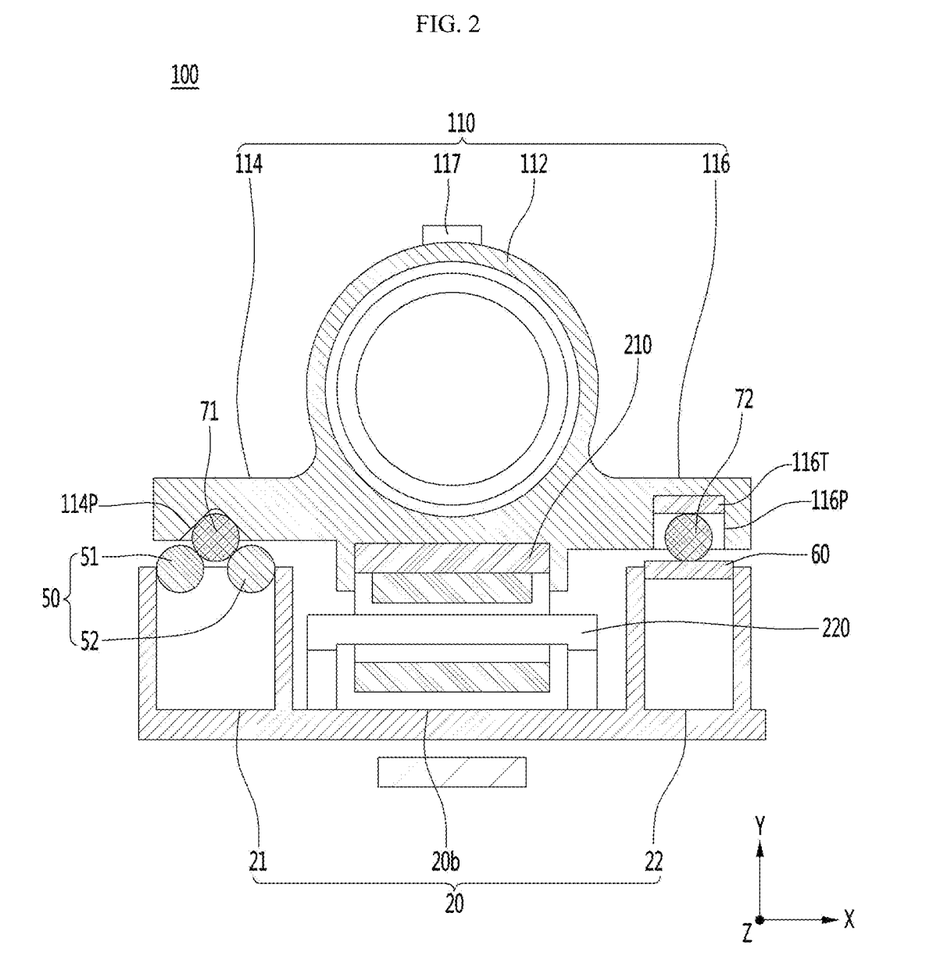
FIG. 2 is a cross-sectional view taken along line A1-A1' of the camera actuator according to the embodiment shown in FIG. 1A.

Next, FIG. 2 is a cross-sectional view of the camera actuator according to the embodiment shown in FIG. 1A taken along line A1-A1' in the Y-axis direction, and technical features of the embodiment will be described in more detail based on FIG. 2.

In an embodiment, the lens housing 110 may include a first protrusion 114 extending from the lens barrel 112 to a first side and a second protrusion 116 extending to the second side of the lens barrel 112. The first and second protrusions 114 and 116 may be members protruding horizontally with respect to the lens barrel 112 and may be referred to as a lobe, an overhang, or the like.

The lens housing 110 may be formed of one or more of polycarbonate, plastic, epoxy, or composite material, but is not limited thereto. The lens barrel 112, the first protrusion 114, and the second protrusion 116 may be formed integrally or individually, but are not limited thereto.

In addition, the lens housing 110 may include a third protrusion 117 protruding upward. The third protrusion 117 may be formed in a plate shape.

According to the embodiment, a scaler (not shown) in which magnets are intersected may be mounted on the third protrusion 117. In addition, a magnetoresistance sensor (MR) (not shown) is disposed at a position corresponding to the scaler to detect and control the position of the lens housing.

According to the embodiment, by disposing the scaler and the magnetoresistance sensor to be spaced apart from the first magnet 260 to be described later, magnetic field interference can be blocked, thereby remarkably improving the sensitivity of position sensing and controllability.

In an embodiment, the bottom surfaces of the first protrusion 114 and the second protrusion 116 may include a first receiving portion 114P and a second receiving portion 116P, respectively, in which the ball 70 can be accommodated.

For example, the first receiving portion 114P having a V-groove-shaped cross section in which the first ball 71 can be accommodated may be provided under the first protrusion 114, but is not limited thereto.

The first receiving portion 114P may be formed singly or in plural according to the number of the first ball 71, and when the number of first ball 71 is two, the first protrusion 114 may accommodate two first receiving portions 114P.

In addition, a second receiving portion 116P in a cylindrical shape may be provided under the second protrusion 116 to accommodate the second ball 72, but is not limited thereto.

The second receiving portion 116P may also be formed singly or in plural according to the number of the second balls 72, and when there are two second balls 72, the second protruding portion 116 is used to accommodate two second receiving portions 116P.

In an embodiment, the inner space of the second accommodating part 116P may be larger than the volume of the second ball 72. Accordingly, the second ball 72 may be rolled in a two-point contact in a state spaced apart from the second receiving portion 116P (one point is in contact with the lower guide plate).

Alternatively, one side surface of the second ball 72 may be rolled by three-point contact while temporarily in contact with the inner side surface of the second receiving portion 116P.

In addition, the cross-sectional shape of the second receiving portion 116P may not have a cylindrical shape, but may have a V-shaped cross-section like the cross-section of the first receiving portion 114P. In this case, the second ball 72 may be rolled in a three-point contact state.

The embodiment may include a second support plate 116T disposed above the second receiving portion 116P. The second support plate 116T may inhibit abrasion of the second receiving portion 116P in an area in contact with the upper side of the second ball 72. The second support plate 116T may have a plate shape having a circular top surface so as to correspond to the outer shape of the cylindrical second receiving portion 116P.

The second support plate 116T may be formed of one or more of a metal or a composite material, but is not limited thereto. For example, the second support plate 116T may be formed of stainless steel, but is not limited thereto. Meanwhile, in the embodiment, the guide plate 60 or the second support plate 116T may be omitted.

Next, a guide pin 50 may be disposed on the first support part 21 of the base 20. For example, the first guide pin 51 and the second guide pin 52 are disposed on the first support part 21, and the first ball 71 disposed in the first receiving part 114P can be guided smoothly.

For example, in the embodiment, two first balls 71 are disposed on the first guide pin 51 and the second guide pin 51, so that there is a technical effect in that the zooming function or the AF function can be smoothly performed even in a high magnification and heavy weight situation.

Therefore, according to the embodiment, it is possible to correct the first and second guide pins 51 and 52 so that the first ball 71 does not move left and right. At the same time, the first ball 71 contacts four points, and the guide pin 50 may support the heavy lens housing 110. Accordingly, the zooming function or the AF function can be smoothly performed even in a situation of magnification and heavy weight, and there is a technical effect of inhibiting the occurrence of lens decenter or lens tilt when the lens is moved.

In addition, a guide plate 60 may be disposed on the second support 22 of the base 20. For example, the guide plate 60 may be disposed on the second support part 22 and the second ball 72 disposed on the second receiving part 116P may be guided smoothly.

For example, in the embodiment, two second balls 72 can be disposed on the guide plate 60 so that the second balls 72 may operate in two-point contact. Accordingly, contact resistance can be minimized and frictional force can be reduced. Therefore, there is a technical effect that the zooming function or the AF function can be performed smoothly even in a situation of high magnification and heavy weight.

Figure 3A:
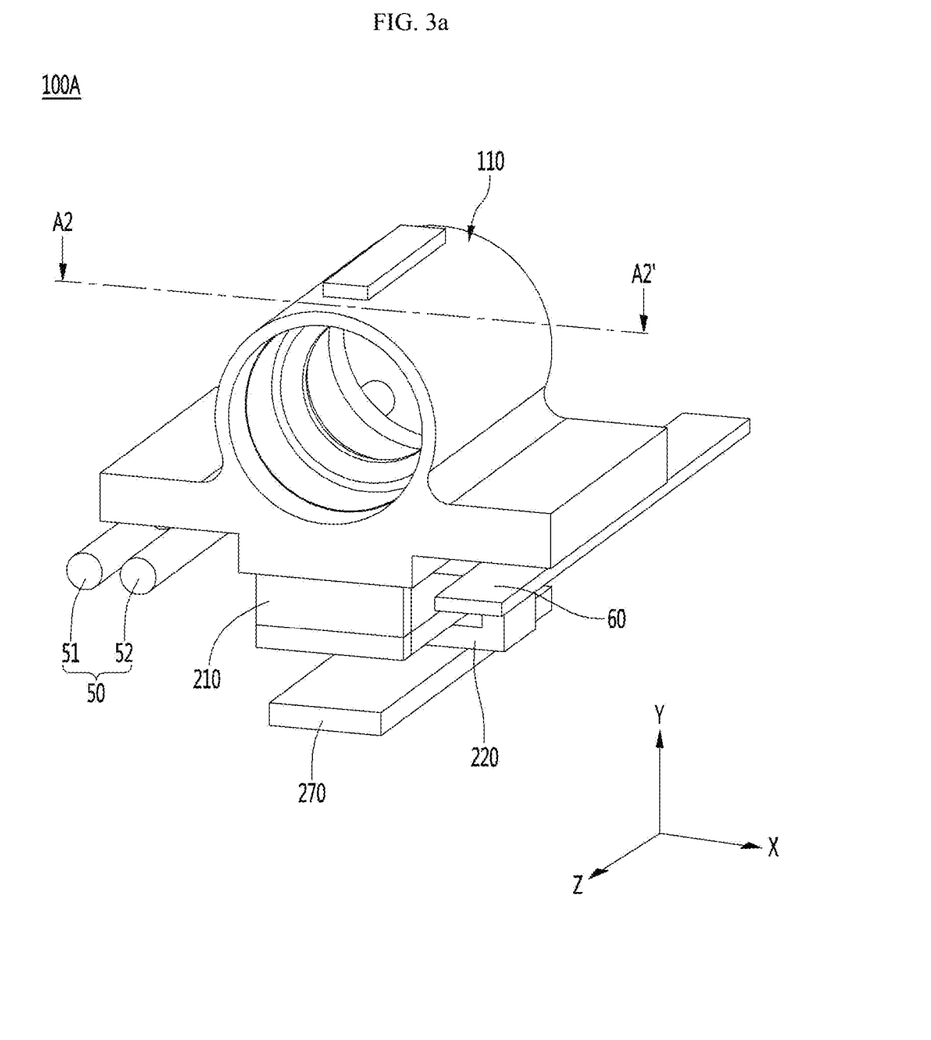
FIG. 3A is a first partial perspective view of a camera actuator according to an embodiment.
Figure 3B:
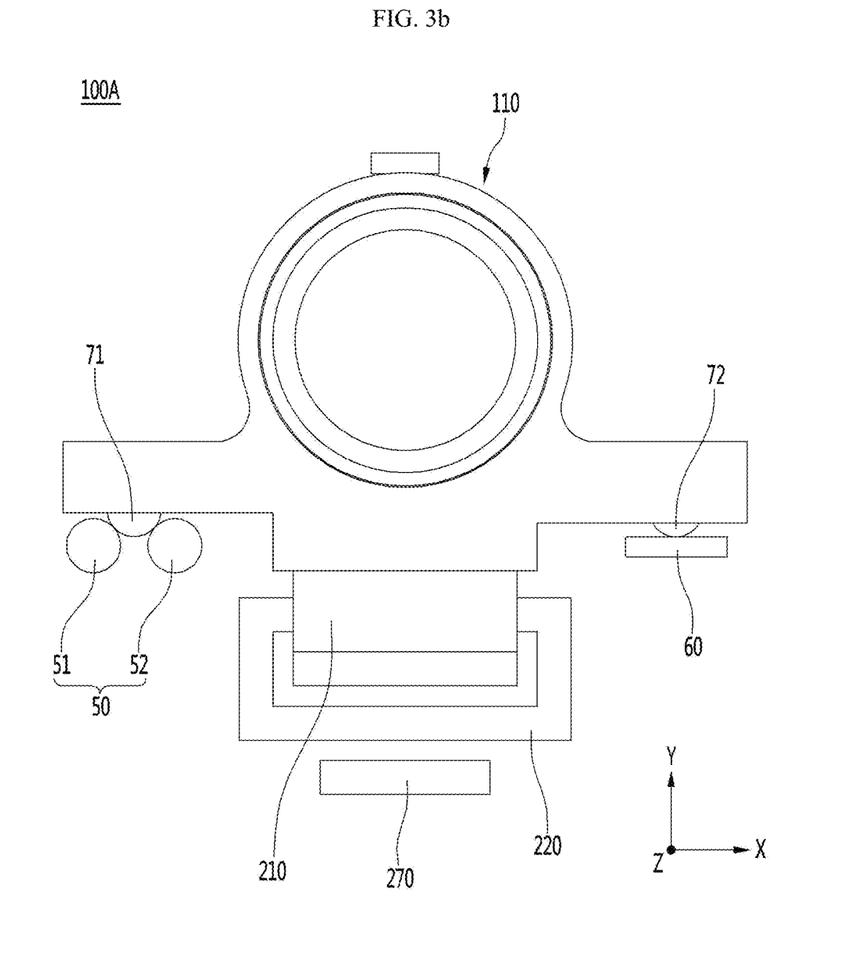
FIG. 3B is a front view of the camera actuator according to the embodiment shown in FIG. 3 A.

Next, FIG. 3A is a perspective view of a first part 100A of the camera actuator according to the embodiment, and FIG. 3B is a front view of the camera actuator according to the embodiment shown in FIG. 3A, in which the base 20 is omitted compared to FIG. 2.

The embodiment may include the yoke assembly 210 disposed under the lens housing 110, the coil unit 220 surrounding the yoke assembly 210, and the second magnet 270 disposed under the yoke assembly 210.

The yoke assembly 210 may be made of iron (Fe), which is a ferromagnetic material, as a main raw material, but is not limited thereto.

Figure 4:
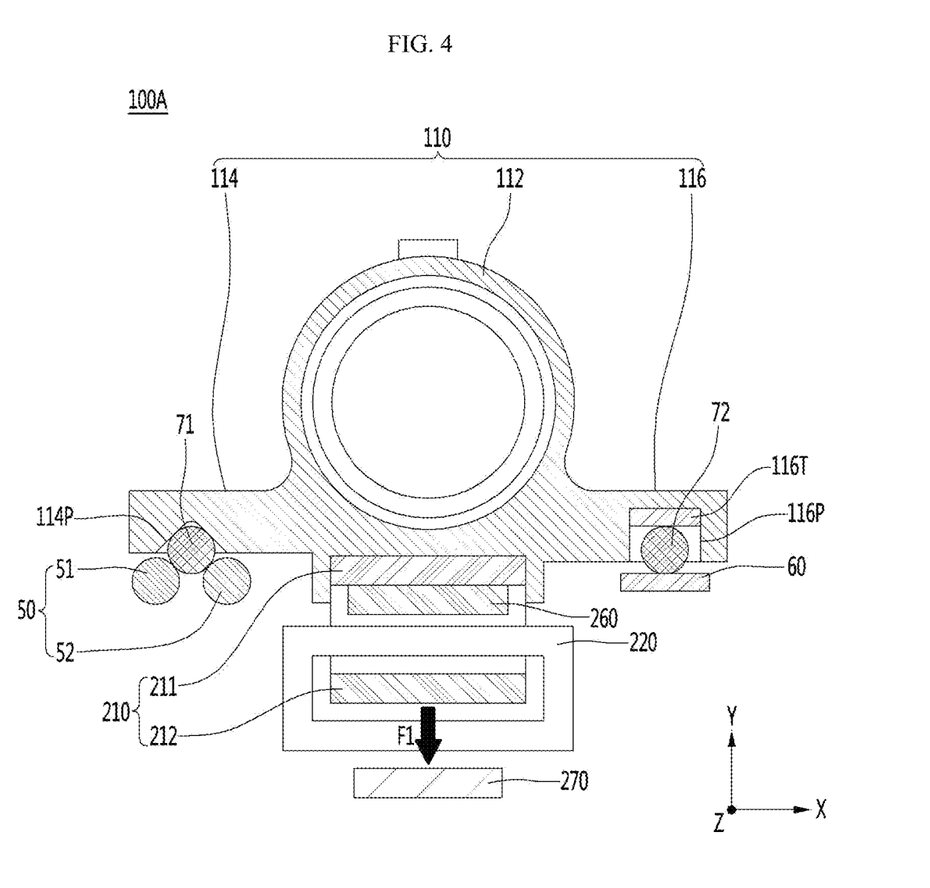
FIG. 4 is a cross-sectional view taken along line A2-A2' of the camera actuator according to the embodiment shown in FIG. 3A.

Next, FIG. 4 is a cross-sectional view of the camera actuator according to the embodiment shown in FIG. 3A taken along line A2-A2' in the Y-axis direction.

Referring to FIG. 4, the yoke assembly 210 may be bonded to the bottom surface of the lens housing 110 with an adhesive or the like.

According to the embodiment, since the lens housing 110 is fixed by the attractive force between the yoke assembly 210 and the second magnet 270, there is a special technical effect capable of stably driving.

For example, a magnetic force (F1) is generated between the yoke assembly 210 and the second magnet 270 so that the second magnet 270 pulls the yoke assembly 210 to generate an attractive force (F1), Accordingly, when the lens housing 110 is driven, the ball 70 can be stably driven in the optical axis direction without being separated from the guide pin 50 or the guide plate 60.

With continued reference to FIG. 4, the embodiment may include a first magnet 260 disposed in the yoke assembly 210.

Figure 5A:
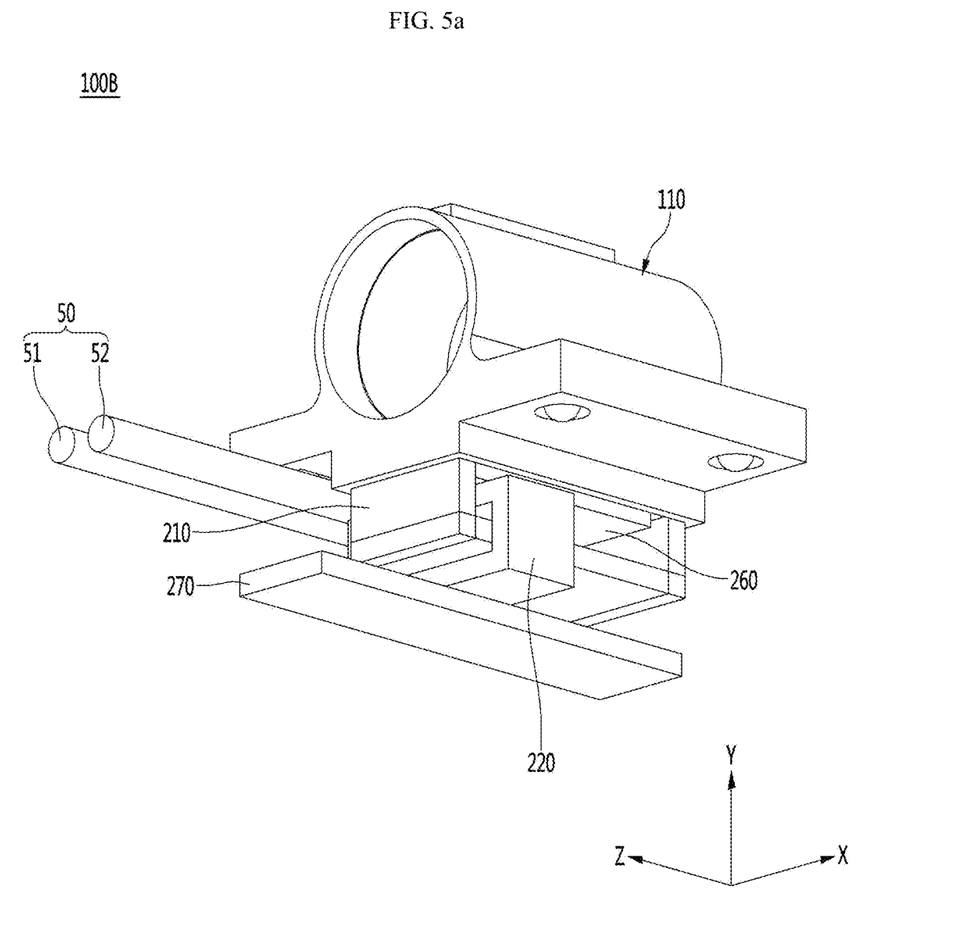
FIG. 5A is a second partial perspective view of a camera actuator according to an embodiment.
Figure 5B:
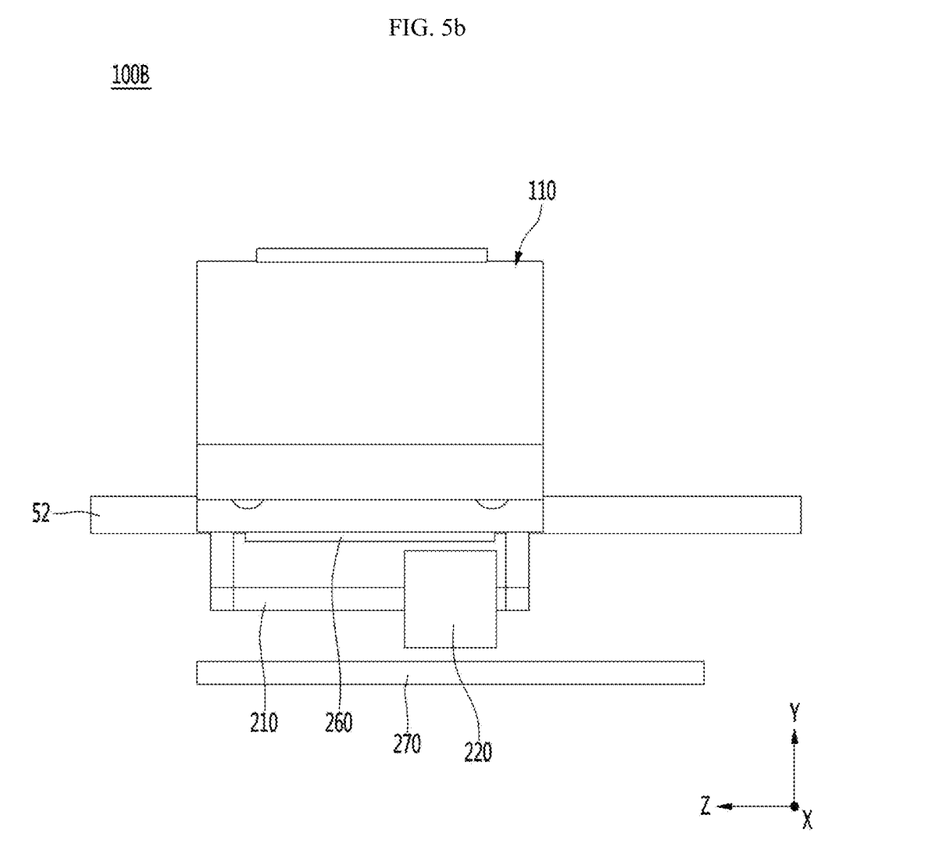
FIG. 5B is a right side view of the camera actuator according to the embodiment shown in FIG. 5A.

Referring momentarily to FIGS. 5A to 6B, FIG. 5A is a perspective view of a second part 100B of the camera actuator according to the embodiment, and FIG. 5B is a right-side view of the camera actuator according to the embodiment shown in FIG. 5A in which the guide plate 60 is omitted compared to FIG. 4, and the lens housing 110 is partially moved in the positive Z-axis direction.

Figure 6A:
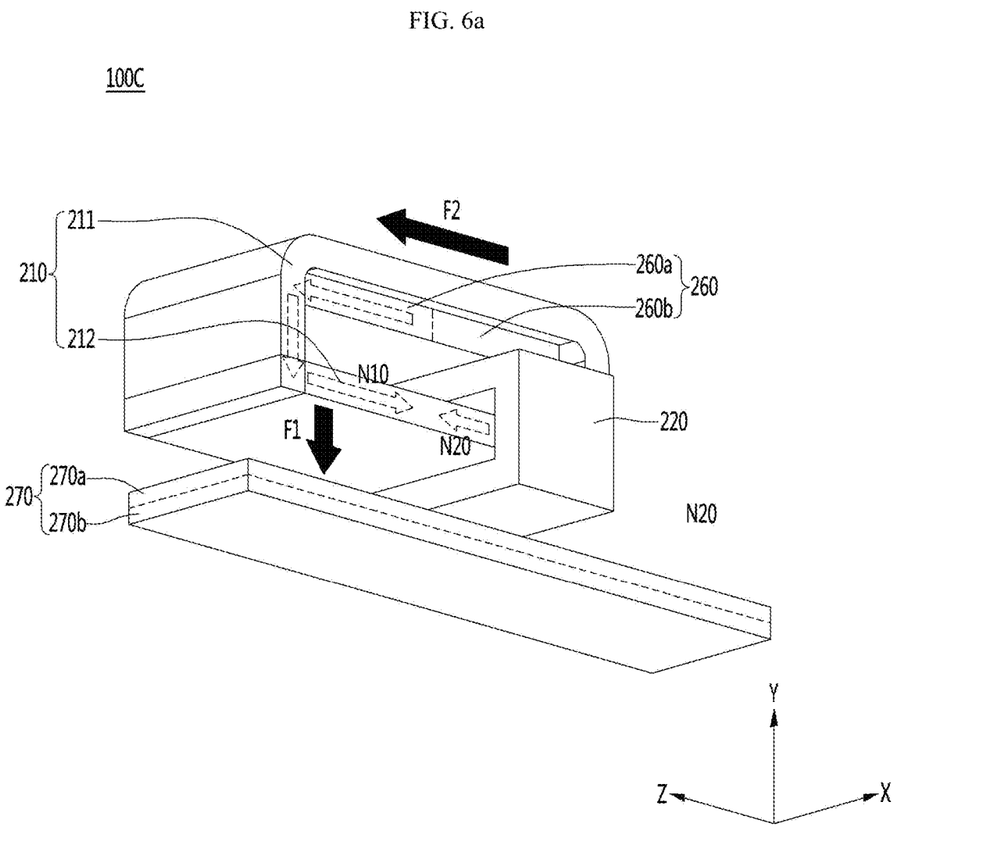
FIG. 6A is a third partial perspective view of a camera actuator according to an embodiment.
Figure 6B:
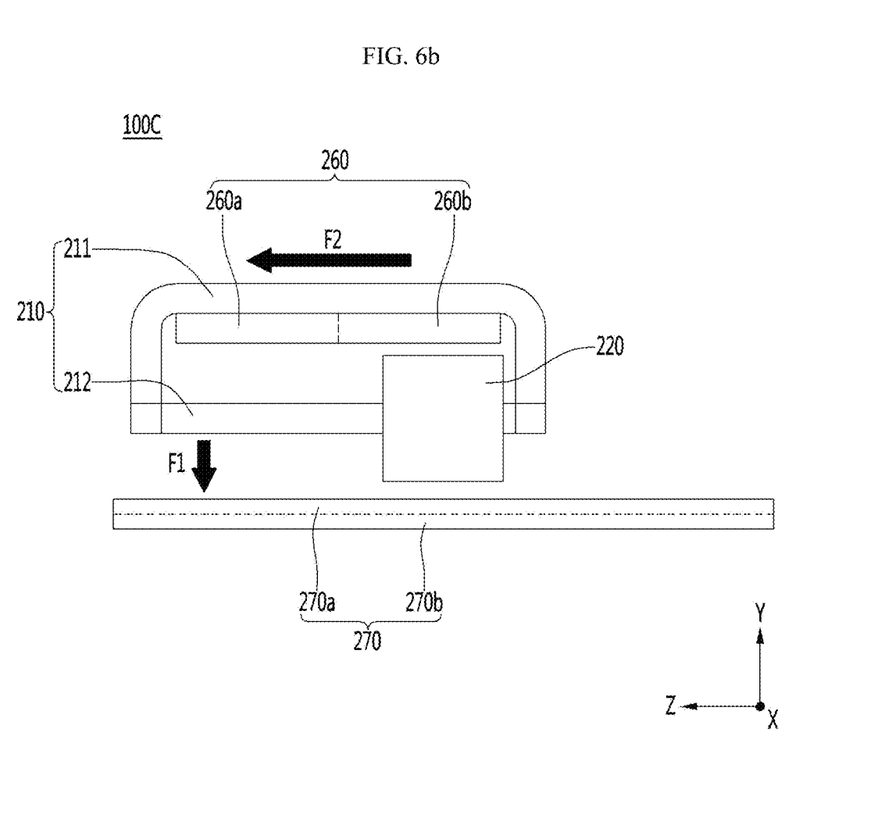
FIG. 6B is a right side view of the camera actuator according to the embodiment shown in FIG. 6A.

FIG. 6A is a perspective view of a third part 100C of the camera actuator according to the embodiment, and FIG. 6B is a right-side view of the camera actuator according to the embodiment shown in FIG. 6A, and is a detailed view for the yoke assembly 210, the coil unit 220, the first magnet 260 and the second magnet 270.

Referring to FIGS. 6A and 6B, in the embodiment, the yoke assembly 210 may be formed in a closed loop shape. For example, the yoke assembly 210 may include a U-shaped first yoke 211 and a second yoke 212 disposed below the first yoke 211 to form a closed loop. The first yoke 211 and the second yoke 212 may be formed of the same material, may be formed integrally or individually, but are not limited thereto.

In an embodiment, the first length of the second yoke 212 in the optical axis direction may be equal to or larger than the second length of the first magnet 260 in the optical axis direction. The second yoke 212 may be disposed to face the first magnet 260, and the first magnet 260 and the second yoke 212 may be disposed in parallel.

The first magnet 260 may be disposed in the yoke assembly 210. For example, the first magnet 260 may be disposed in a state in which the first yoke 211 is coupled with an adhesive or the like. The first magnet 260 may include a first-first magnet part 260a and a first-second magnet part 260b. The first-first magnet part 260a may be an N-pole, and the first-second magnet part 260b may be an S-pole, but the present invention is not limited thereto.

In addition, in the embodiment, the coil unit 220 may be disposed to surround the yoke assembly 210. For example, the coil unit 220 may be arranged to wind the second yoke 212.

The coil unit 220 may be disposed on the base body 20b and may be electrically connected to an external power source.

The first yoke 211 and the second yoke 212 may be elongated in the optical axis direction, and the coil unit 220 may be elongated in a direction perpendicular to the optical axis, for example, in the X direction.

For example, in the embodiment, the coil unit 220 can wind the second yoke 212 to form an electromagnet in a solenoid type, thereby increasing the efficiency of a magnet. Accordingly, it is possible to obtain a driving force F2 capable of reciprocating movement in the optical axis direction by interaction with the first magnet 260.

According to the embodiment, since the first magnet 260, which is a driving magnet, may be shielded by the yoke assembly 210, interference between magnetic fluxes such as other magnets can be inhibited, and magnetic force rotates in the yoke assembly 210. Magnetic force F2 of attractive force or repulsive force may be generated by an interaction between the magnetic flux and the solenoid force generated in the coil unit 220.

For example, referring to FIG. 6A, the first magnet 260 may be disposed in the yoke assembly 210. Accordingly, the magnetic flux generated in the first magnet 260 can rotate in the yoke assembly 210 along the first yoke 211 and the second yoke 212.

For example, when the first-first magnet part 260a is the N pole, the first magnetic flux N10 of the N pole can turn in the yoke assembly 210 along the first yoke 211 and the second yoke 212.

At this time, when power is applied to the coil unit 220 and current flows, a second magnetic flux N20 may be generated by the solenoid effect, and when the second magnetic flux N20 is in the N-pole direction as shown in FIG. 6A, repulsive force can be generated between them. Accordingly, the yoke assembly 210 may move in the optical axis direction by receiving the repulsive force F2 in the Z-axis direction.

In the embodiment, the propagating rate of the magnetic flux N10 generated by the first magnet 260 along the first yoke 211 and the second yoke 212 formed of ferromagnetic objects is very high rather than the propagating rate of the magnetic flux N10 along the air inside the yoke assembly 210. Accordingly, according to the embodiment, the direction of the second magnetic flux N20 that is variable according to the current direction with respect to the direction of the first magnetic flux N10 fixed according to the seating of the first magnet 260 can be controlled. Accordingly, the embodiment has a special technical effect that can precisely reciprocate the yoke assembly 210 in the optical axis direction by generating a repulsive force or attractive force in relation to the first magnetic flux N10.

In the embodiment, if the length of the yoke assembly 210 and the first magnet 260 are increased, there is a technical effect in that the camera actuator can be moved regardless of the stroke, and long-distance movement is possible using the guide pin 50 and the guide plate 60, so high magnification zoom.

Referring to FIGS. 6A and 6B, in an embodiment, the second magnet 270 may include a second-first magnet part 270a and a second-second magnet part 270b. The second-first magnet part 270a may be an N pole, and the second-second magnet part 270b may be an S pole, but it is not limited thereto.

According to the embodiment, a magnetic force F1 can be generated between the second yoke 212 and the second magnet 270, so that the second magnet 270 pulls the yoke assembly 210 and the attractive force F1 can be generated. Accordingly, when the lens housing 110 is driven, the ball 70 may be stably driven in the optical axis direction without being separated from the guide pin 50 or the guide plate 60.

In addition, according to the embodiment, since the yoke assembly 210 can shield the magnetic force of the second magnet 270, there is a special technical effect that can inhibit magnetic field interference.

For example, in the embodiment, since the second yoke 212 can shield the magnetic force of the second magnet 270, there is a special technical effect in that a magnetic field interference between the second magnet 270 and the first magnet 260 can be inhibited.

Referring back to FIG. 4, the yoke assembly 210 and the first magnet 260 may be disposed in a center portion of a lower side of the lens housing 110.

On the other hand, in a non-disclosed internal technology, as a driving magnet (not shown) is disposed on one side of the lens housing, a center of gravity of the lens housing was difficult to be set, and the possibility of lens decenter or lens tilt was high.

However, according to the embodiment, the yoke assembly 210 and the first magnet 260 may be disposed in the lower center of the lens housing 110. Accordingly, the yoke assembly 210 and the first magnet 260 may hold the center of gravity of the lens housing 110 when the lens housing 110 is moved even in a high magnification and heavy weight situation. Therefore, there is a special technical effect of inhibiting the occurrence of lens decenter or lens tilt by inhibiting tilting.

In addition, according to an embodiment, the lens housing 110 may be driven by magnetic force between the coil unit 220 and the first magnet 260 disposed at the lower center of the lens housing 110. Accordingly, since the position at which the driving force F2 (refer to FIGS. 6A and 6B) is generated becomes the center of the lens housing 110, the driving force F2 can be maximized. Therefore, there is a special technical effect that can effectively perform the zooming function in the camera module even in the situation of high magnification and heavy weight.

On the other hand, in the non-disclosed internal technology, a driving magnet (not shown) is disposed on one side of the lens housing, and the lens is driven by electromagnetic force according to the interaction with the coil unit disposed on the side of the base. Accordingly, in the internal technology, since the position at which the driving force is generated cannot be the center of the lens housing, there is a problem in that the driving force cannot be properly transmitted at a location far from the generated driving force.

On the other hand, according to the embodiment, as the coil unit 220 and the first magnet 260 are disposed in the lower center of the lens housing 110, there is a special technical effect in that the driving force F2 can be maximally and uniformly utilized and the embodiment can effectively perform the zooming function or the AF function, even in a situation of high weight and high magnification.

In an embodiment, the width of the first magnet 260 in the X-axis direction may be smaller than the horizontal width of the first yoke 211 in the X-axis direction.

In addition, in an embodiment, the width of the first magnet 260 in the X-axis direction may be smaller than the horizontal width of the second yoke 212 in the X-axis direction. Accordingly, there is a special technical effect of controlling the magnetic flux generated in the first magnet 260 to be shielded in the yoke assembly 210 and rotated therein.

In the embodiment, the horizontal width of the coil unit 220 in the X-axis direction may be larger than the horizontal width of the second yoke 212 in the X-axis direction, and may be formed to surround the second yoke 212. Accordingly, it is possible to effectively generate an electromagnetic magnetic force due to a solenoid effect through the coil unit 220 surrounding the second yoke 212.

In addition, in an embodiment, the horizontal width of the second yoke 212 in the X-axis direction may be larger than the horizontal width of the second magnet 270 in the X-axis direction. Accordingly, the lens housing 110 can be stably maintained by the magnetic force F1 according to the attractive force between the second magnet 270 and the second yoke 212. At the same time, the magnetic flux generated by the second magnet 270 can be inhibited from magnetic interference with other magnetic materials such as the first magnet 260, thereby providing a complex technical effect of precisely actuating the camera module.

The camera actuator and the camera module including the same according to the embodiment have a technical effect that the zooming function or the AF function can be smoothly performed in a situation of high magnification and heavy weight.

For example, according to the embodiment, the first and second guide pins 51 and 52 can correct the movement of the first ball 71 left and right, and at the same time, the first ball 71 contacts four points. Since the guide pin 50 can support the heavy weight lens housing 110, the zooming function or the AF function can be smoothly performed even in a high magnification and heavy weight situation, and there is a technical effect that can inhibit the occurrence of tilt when the lens is moved.

In addition, according to the embodiment, there is a technical effect of inhibiting occurrence of a lens decenter or a lens tilt when a lens is moved under a high magnification and heavy weight situation.

For example, according to the embodiment, the yoke assembly 210 and the first magnet 260 may be disposed in the lower center of the lens housing 110. Accordingly, the yoke assembly 210 and the first magnet 260 may hold the center of gravity of the lens housing 110 when the lens housing 110 is moved even in a high magnification and heavy weight situation. Therefore, there is a special technical effect that can inhibit the lens from tilting, thereby inhibiting the occurrence of lens decenter or lens tilt.

In addition, according to the embodiment, there is a technical effect of inhibiting the occurrence of friction torque when the lens is moved through zooming in the camera module in a situation of high magnification and heavy weight.

For example, according to the embodiment, the lens housing 110 may be driven by a magnetic force between the coil unit 220 and the first magnet 260 disposed at the lower center of the lens housing 110. Accordingly, since the position at which the driving force F2 (refer to FIGS. 6A and 6B) is generated becomes the center of the lens housing 110, the driving force F2 can be maximized. Therefore, there is a special technical effect that can effectively perform the zooming function in the camera module even in the situation of high magnification and heavy weight.

INDUSTRIAL APPLICABILITY

Figure 7:
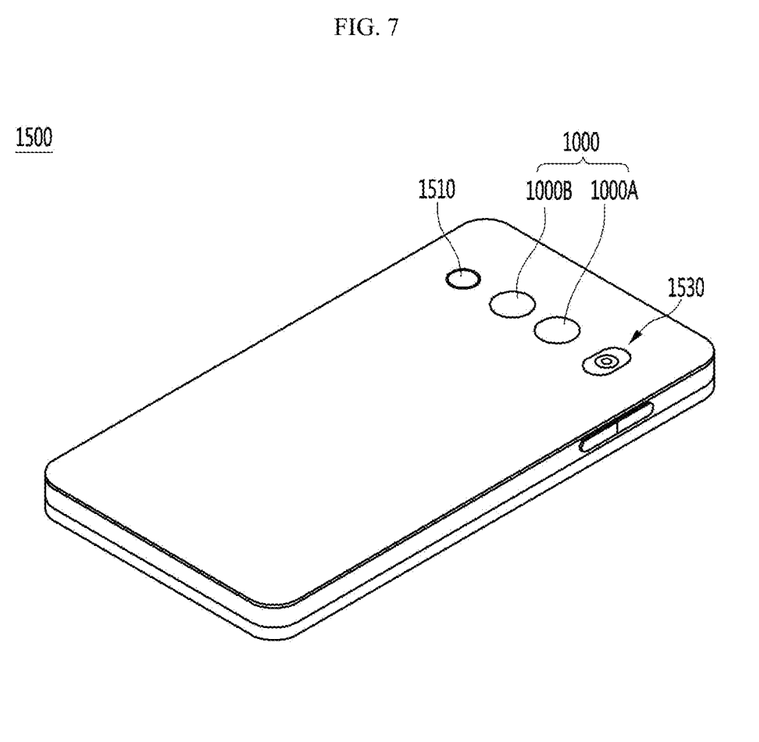
FIG. 7 is a perspective view of a mobile terminal to which a camera module according to an embodiment is applied.

Next, FIG. 7 is a perspective view of a mobile terminal 1500 to which a camera module according to an embodiment is applied.

As shown in FIG. 7, the mobile terminal 1500 according to the embodiment may include a camera module 1000, a flash module 1530, and an autofocus device 1510 provided on the rear side.

The camera module 1000 may include an image capturing function and an auto focus function. For example, the camera module 1000 may include an auto focus function using an image.

The camera module 1000 processes an image frame of a still image or a moving picture obtained by an image sensor in a photographing mode or a video call mode. The processed image frame may be displayed on a predetermined display unit and stored in a memory. A camera (not shown) may also be disposed in front of the mobile terminal body.

For example, the camera module 1000 may include a first camera module 1000A and a second camera module 1000B, and OIS is implemented with an AF or zoom function by the first camera module 1000A. For example, the first camera module 1000A may include a first camera actuator that functions as an AF or zoom function and a second camera actuator that functions as an OIS function.

The first camera actuator may include the camera actuator 100 according to the embodiment described above.

The flash module 1530 may include a light emitting device that emits light therein. The flash module 1530 may be operated by a camera operation of a mobile terminal or a user's control.

The autofocus device 1510 may include one of a package of a surface light emitting laser device as a light emitting unit.

The auto focus device 1510 may include an auto focus function using a laser. The autofocus device 1510 may be mainly used in a condition in which an autofocus function using an image of the camera module 1000 is deteriorated, for example, in a proximity or dark situation of 10$m$ or less. The autofocus device 1510 may include a light emitting unit including a vertical cavity surface emission laser (VCSEL) semiconductor device, and a light receiving unit that converts light energy such as a photodiode into electrical energy.

Features, structures, effects, and the like described in the embodiments above are included in at least one embodiment, and are not necessarily limited to only one embodiment. Furthermore, the features, structures, effects, and the like illustrated in each embodiment may be combined or modified for other embodiments by a person having ordinary knowledge in the field to which the embodiments belong.

Therefore, the contents related to these combinations and modifications should be construed as being included in the scope of the embodiment.

Although the embodiments have been described above, these are only examples and are not intended to limit the embodiments, and those of ordinary skill in the field to which the embodiments belong to various types not exemplified above without departing from the essential characteristics of the present embodiment. It will be seen that branch transformation and application are possible. For example, each component specifically shown in the embodiment can be modified and implemented. And differences related to these modifications and applications should be construed as being included in the scope of the embodiments set in the appended claims.

The invention claimed is:

1. A camera actuator comprising:
a base;
a lens housing disposed on the base and configured to move in an optical axis direction;
a guide pin disposed on the base and extended along the optical axis direction;
a ball disposed between the guide pin and the lens housing;
a magnet disposed on a first surface of the lens housing; and
a coil unit facing the magnet in a first direction perpendicular to the optical axis direction;
wherein the guide pin comprises a first guide pin and a second guide pin separated from each other in a second direction perpendicular to the optical axis direction and the first direction,
wherein the base comprises a base body, and first and second support parts disposed on the base body, and
wherein the ball comprises: a first ball disposed between the guide pin and the lens housing; and a second ball disposed between a support plate within the lens housing and a guide plate on the second support part.

2. The camera actuator according to claim 1, wherein the lens housing comprises a first receiving portion on a bottom surface thereof.

3. The camera actuator according to claim 2, wherein the first ball is disposed on the first receiving portion.

4. The camera actuator according to claim 1, wherein the first ball is in contact with a side surface of each of the first guide pin and the second guide pin.

5. The camera actuator according to claim 2, wherein the first guide pin and the second guide pin are disposed on the first support part.

6. The camera actuator according to claim 5, wherein the first ball is disposed on the first receiving portion, and the first ball is in contact with a side surface of each of the first guide pin and the second guide pin.

7. The camera actuator according to claim 1, comprising:
a first yoke disposed in the lens housing;
a second yoke disposed under the first yoke to form a closed loop together with the first yoke,
wherein the magnet is coupled to an inside of the first yoke; and
wherein the coil unit is configured to face the magnet and to surround a part of the first yoke, and is fixed to the magnet.

8. The camera actuator according to claim 7, wherein a first length of the second yoke in the optical axis direction is greater than or equal to a second length of the magnet in the optical axis direction.

9. A camera actuator comprising:
a base including at least one support part;
a lens housing disposed on the base and configured to move in an optical axis direction;
at least one guide pin disposed on the base and extended along the optical axis direction;
at least one ball disposed between the base and the lens housing;
a magnet disposed on a first surface of the lens housing; and
a coil unit facing the magnet in a first direction perpendicular to the optical axis direction;
wherein the base comprises a base body, and first and second support parts disposed on the base body, and
wherein the least one ball comprises: a first ball disposed between the guide pin and the lens housing; and a second ball disposed between a support plate within the lens housing and a guide plate on the second support part.

10. The camera actuator according to claim 9, wherein the least one guide pin comprises a first guide pin and a second guide pin separated from each other in a second direction perpendicular to the optical direction and the first direction.

11. The camera actuator according to claim 9, wherein the lens housing comprises a first receiving portion on a bottom surface thereof, wherein the first ball is disposed on the first receiving portion.

12. The camera actuator according to claim 9, wherein the first ball is in contact with a side surface of each of the first guide pin and the second guide pin.

13. The camera actuator according to claim 9, wherein the first guide pin and the second guide pin are disposed on the first support part.

14. The camera actuator according to claim 13, wherein the first ball is disposed on the first receiving portion, and the first ball is in contact with a side surface of each of the first guide pin and the second guide pin.

15. The camera actuator according to claim 9, comprising:
a first yoke disposed in the lens housing;
a second yoke disposed under the first yoke to form a closed loop together with the first yoke,
wherein the magnet is coupled to an inside of the first yoke; and
wherein the coil unit is configured to face the magnet and to surround a part of the first yoke, and is fixed to the magnet.

16. The camera actuator according to claim 15, wherein a first length of the second yoke in the optical axis direction is greater than or equal to a second length of the magnet in the optical axis direction.

* * * * *